Oct. 2, 1923.

B. GERSHOVITZ

DUMP WAGON

Filed Dec. 13, 1922

1,469,637

Inventor
Barnett Gershovitz
By Frease and Bond
Attorneys

Patented Oct. 2, 1923.

1,469,637

UNITED STATES PATENT OFFICE.

BARNETT GERSHOVITZ, OF CANTON, OHIO.

DUMP WAGON.

Application filed December 13, 1922. Serial No. 606,748.

*To all whom it may concern:*

Be it known that I, BARNETT GERSHOVITZ, a citizen of Russia, residing at Canton, in the county of Stark and State of Ohio, have invented a new and useful Dump Wagon, of which the following is a specification.

This invention relates to dump wagons or trucks, and more particularly to a mechanical means for tilting the body of a wagon or truck to dump the contents thereof.

The objects of the invention are to provide a wagon or truck body hinged near its rear end upon the frame of the vehicle and provided with a link and lever mechanism operated by a worm gear for tilting the body upon the frame; for holding the body at any desired angle and for returning the body to the normal position.

The above and other objects may be attained by constructing the vehicle in the manner illustrated in the accompanying drawing, in which—

Figure 1:
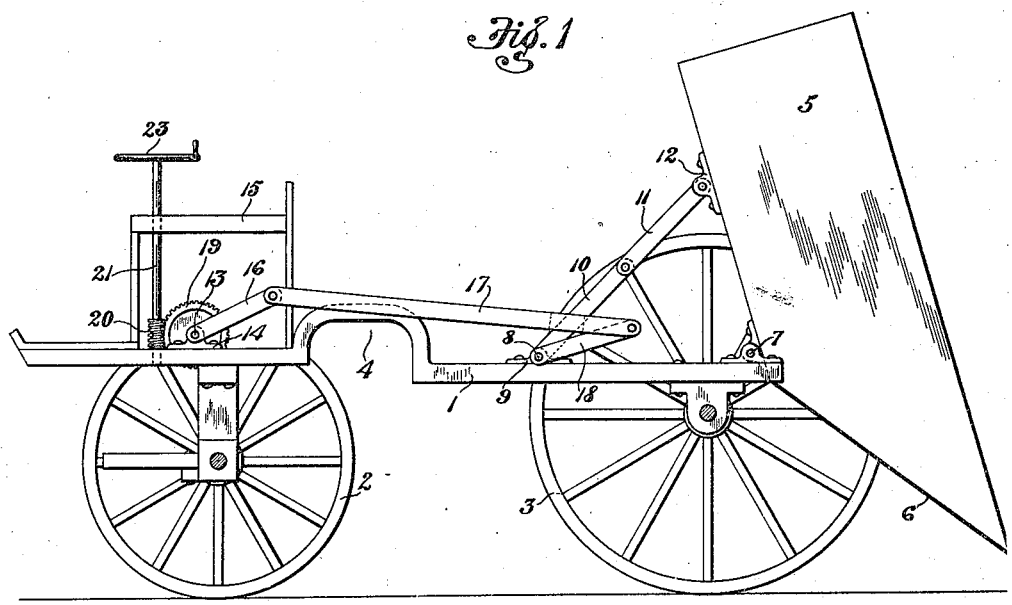
Figure 2:
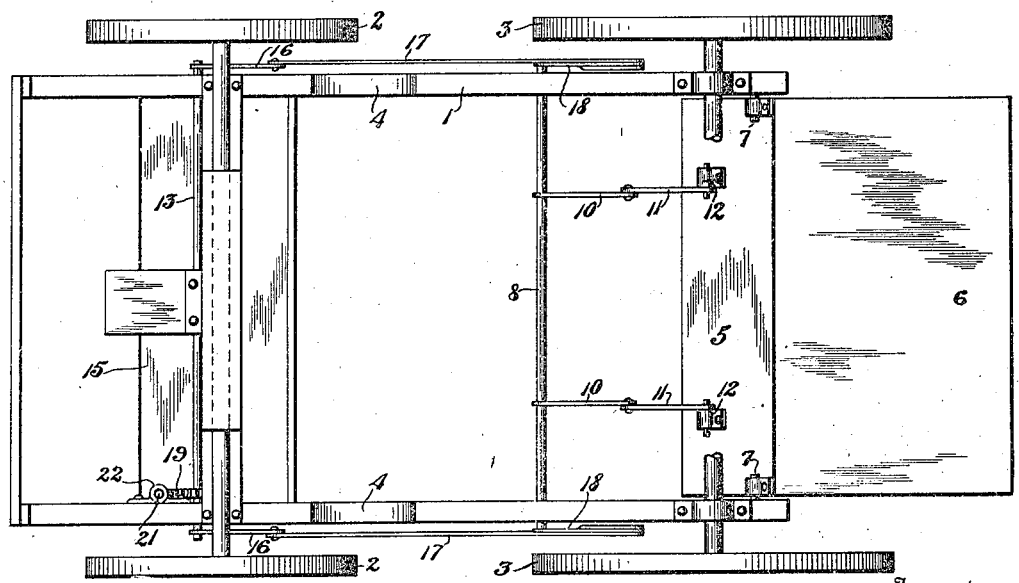

Figure 1 is a side elevation of a dump wagon embodying the invention, showing the wagon body in the raised position; and Fig. 2, a bottom plan view of the same.

Similar numerals of reference indicate corresponding parts throughout the drawing.

The frame 1 of the vehicle is supported upon the front and rear wheels 2 and 3 respectively, and may be of any usual and approved construction, being preferably provided with the arch 4 to permit the front wheels to turn therebeneath. Although a horse drawn vehicle is shown in the drawings, it will be understood that a motor driven truck may be provided with the improved dump body to which the invention pertains.

The body 5 of the wagon is preferably of the shape best shown in Fig. 1, having the inclined rear end portion 6, being pivoted in rear of the center, as at 7, upon the rear end portion of the frame 1.

A rocker shaft 8 is journaled in bearings 9 upon the frame 1 and provided with a spaced pair of rocker arms 10 located between the side members of the frame and beneath the body, said rocker arms being pivotally connected at their free ends to the links 11, the upper ends of which are pivotally connected to the bearings 12, fixed upon the under side of the body.

A rocker shaft 13 is journaled in bearings 14 at the forward end of the vehicle, preferably beneath the driver's seat which is indicated at 15, and is provided upon its outer ends with a pair of rocker arms 16, a link 17 connecting the free end of each of said rocker arms with a similar arm 18 fixed upon the rocker shaft 8.

A worm gear 19 is fixed upon the shaft 13 and meshes with a worm 20 upon a vertical shaft 21 journaled in bearings 22 upon the forward portion of the frame, said shaft extending upward beside the driver's seat and being provided with a hand wheel 23 or the like, by means of which the shaft may be easily rotated from the driver's seat.

In the normal position, the body 5 is held in horizontal position upon the frame 1, the rocker shafts and levers being rocked forward into position to retain the body in this position.

When it is desired to tilt the body rearwardly, the hand wheel 23 is operated by the driver in a direction to turn the rocker shaft 13 rearward, through the action of the worm gearing, rocking the arms 16 to the position shown in Fig. 1, and through the links 17 and arms 18, rocking the shaft 8 into position to raise the arms 10 thereon and through the links 11, tilt the body 5 into the position shown in said figure, when the contents of the body will be dumped therefrom.

It will be seen that the body may be moved to any position between the horizontal and that shown in Fig. 1 and held in this position, as the worm cannot be rotated by the worm gear 19 and a lock is thus provided by the worm gearing for holding the body in any intermediate position.

I claim:—

A dump wagon including a frame, a body pivotally mounted near its rear end upon the frame, a rocker shaft upon the frame, a rocker arm upon the shaft, a link pivotally connecting the rocker arm and body, a second rocker arm upon the shaft, a second rocker shaft mounted in the forward portion of the frame, a rocker arm on said second shaft, a link connecting said last named rocker arms, a worm gear upon the second shaft, a worm meshing with said gear and means for operating said worm.

In testimony that I claim the above, I have hereunto subscribed my name.

BARNETT GERSHOVITZ.